April 2, 1968     A. ALVAREZ-CALDERON     3,375,998
LEADING EDGE FLAP AND APPARATUS THEREOF
Filed April 16, 1962                         2 Sheets-Sheet 2
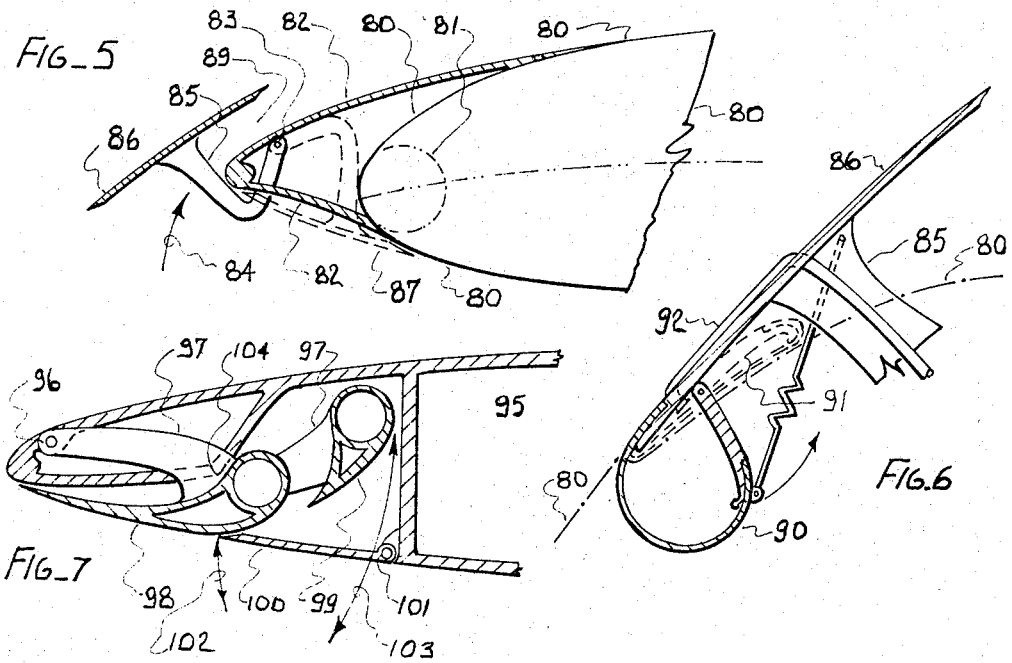
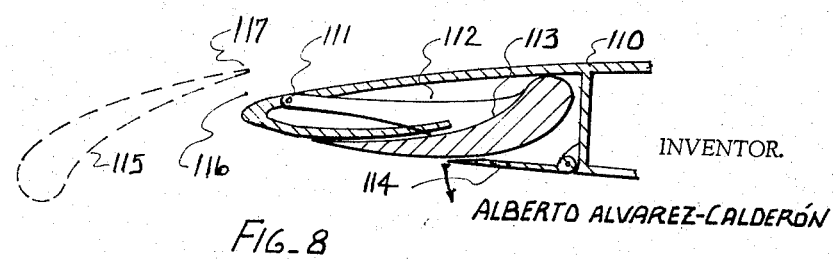
INVENTOR.
ALBERTO ALVAREZ-CALDERON

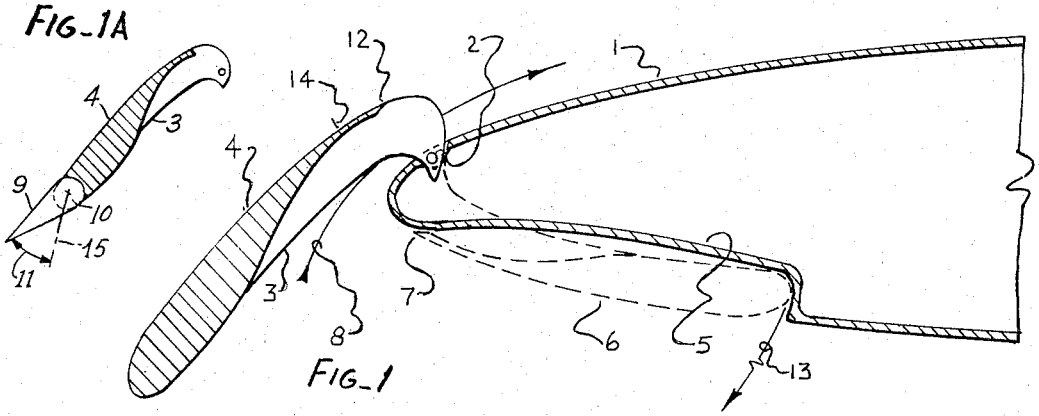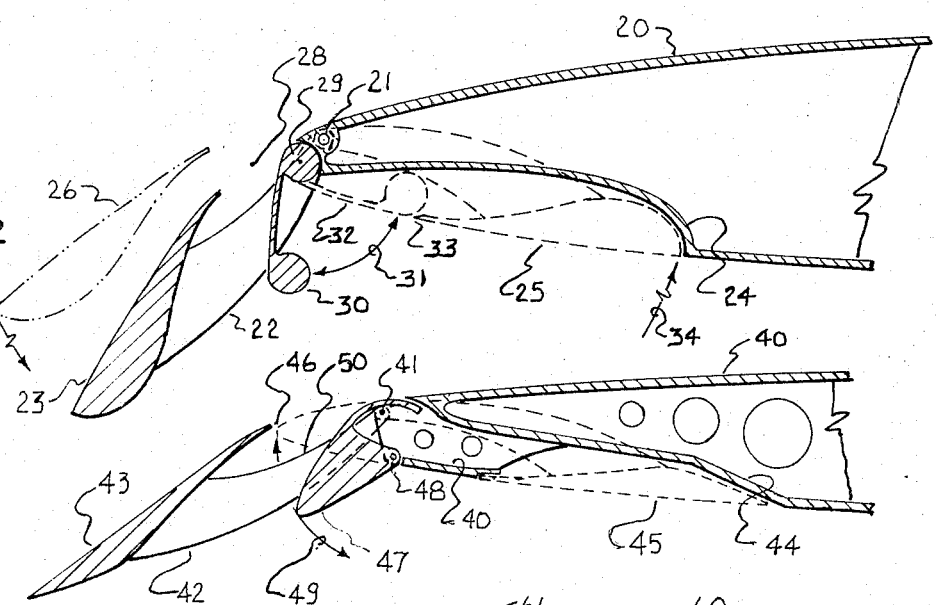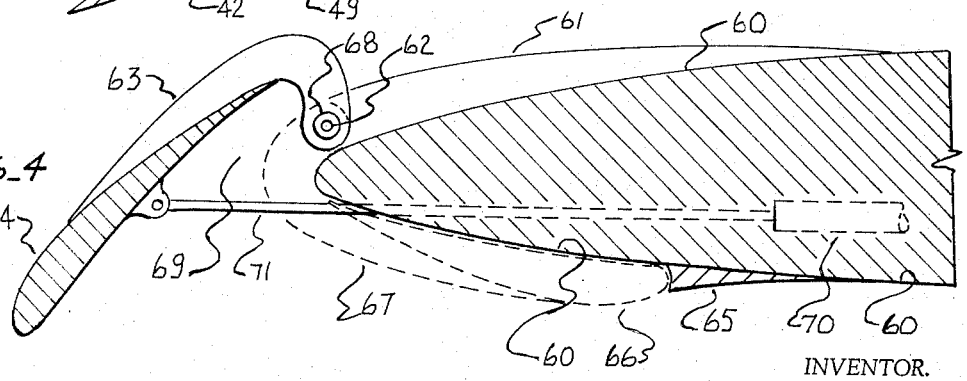

United States Patent Office 3,375,998
Patented Apr. 2, 1968

3,375,998
LEADING EDGE FLAP AND APPARATUS THEREOF
Alberto Alvarez-Calderon, Palo Alto, Calif.
(Av. Salaverry 3463 Orrantia, Lima, Peru)
Filed Apr. 16, 1962, Ser. No. 187,903
5 Claims. (Cl. 244—42)

The present invention is related to high-lift leading edge devices for lifting surfaces, wings and the like. More specifically, this invention concerns new and superior structures for slotted leading edge flaps on aircraft wings.

High lift leading edge devices for wings have been known since the early days of aviation. The recent emphasis on the use of thin wings for high speed aircraft, and the use of powerful trailing edge flaps with Boundary layer control, has created special problems of flow separation and deterioration at leading edge of wings at large lift coefficients. As a result of these problems, numerous high lift leading edge devices are now needed and used in aircraft.

These leading edge high lift devices can be aerodynamically grouped into two categories: One is the unslotted camber-changing structures at the leading edge of the wing, for instance the well known "Kruger" flap and the droop leading edges. These high lift devices are discussed in the book, "Theory of Wing Sections," by I. H. Abbot and A. E. Von Doenhoff, p. 230, published by Dover Publications, Inc. These types of structure improve the shape of the airfoil for high lift flows but do not provide reenergizing of the flow or of the boundary layer on the wing. As is well known the Kruger flap is one of the simplest of the unslotted leading edge devices. It consists in a spanwise pivoted door in the leading edge of the wing and is mechanically similar to the well known trailing edge split flap. From the aerodynamic aspect, the Kruger flap increases the lift coefficient and angle of attack of thin wings by values smaller than those that could be obtained with slotted leading edge flaps of an appropriate shape.

For the case of medium thick wings, the effects of the Kruger flap are not large and may be even detrimental. The Kruger type of flap is commonly used in the thin wings of some high speed jet aircraft to obtain some improvement in lift because of its mechanical simplicity and also because it permits a smooth uninterrupted upper surface for the wing.

A second group of leading edge devices are those which not only provide for a camber increase in the wing, but also provide for flow and boundary layer reenergizing by means of a spanwise slot at its forward position. One such device called a slat is shown in FIG. 141, p. 236 of the aforementioned reference.

The slotted leading edge devices which increase the wings camber, because of its flow reenergizing feature, provide a larger increment of lift coefficient and angle of attack than those possible with unslotted camber increasing leading edge devices. The feature of flow reenergizing is specially important at large absolute magnitudes of lift coefficients, for in this condition the induced upwash at the leading edge of the wing is large. This condition would exist, for example, in the case of a trailing edge flap with boundary layer control, an STOL airplane, or a tilt wing VTOL airplane. Large localized angles of attack would also favor the use of a slotted leading edge device.

However, the mechanical complexities of slotted leading edge devices which retract smoothly to the wing's surface for high speed flight are serious. Usually it is required that the slat unlike the pivoted Kruger flap, should translate forward and downwards as well as rotate downwards. Additionally, even in the best arrangements proposed so far, for slotted leading edge devices, in the slat retracted position there exists a surface interruption in the upper surface of the wing which increase drag at high speed. This interruption is important since it precipitates a turbulent boundary layer in the upper wing surface and it also offers a localized drag increment for typical construction methods.

It is therefore evident that the slotted leading edge flaps or slats as proposed so far have structural complications and drag disadvantages which in many cases have greater weight than their special high lift advantages. It is evident that a superior mechanical leading edge device would be one which would combine the structural and mechanical advantages of the Kruger type of flap (a simple pivotal connection, no translation on tracks and no interruptions of the skin in the upper wing surface for high speed) with the aerodynamic advantages of a slotted leading edge flap or slat. (Flow and boundary layer reenergizing at the wing's leading edge to produce greater lifts and range of angles of attack.

I have invented such a leading edge structure which combines the aerodynamic and structural advantages of each of the types of leading edge devices in unique cooperation between the wing and the device. In addition, my slotted leading edge flap is superior because there is no abrupt change in slope on the wing's upper surface like that present in wings with slats at the wing location corresponding to the trailing edge of the retracted slat.

Moreover, my improved slotted high lift leading edge device can have a cross sectional shape substantially independent from the cross shape of the upper leading edge portion of the basic airfoil. This characteristic makes it superior for thin high speed airfoils since its shape need not conform to that of the thin wing leading edge as is usually the case with conventional slats. For thicker wings, this also permits to select the basic wing camber for cruising conditions but yet retain a leading edge flap cross shape of large curvature suitable for very high lifts.

It is one purpose of this invention to provide structure for a superior pivoted slotted leading edge flap which retracts into the lower forward portion of the wing.

Yet another purpose of the invention is to provide such a structure in which the curvature and leading edge radius of the flap is greater than those of the wing.

Another object of this invention is to provide a slotted pivoted leading edge device which can be incorporated easily into existing aircraft without serious modification of their existing wing structure.

Yet one more object of this invention is to provide a slotted leading edge shape structure in which the pivotal connection between the wing and the flap falls within the airfoil's contour.

Yet another object of this invention is to provide a slotted pivoted leading edge device of the type described that can be mounted on the wing chordwise fences.

One more object of the invention is to provide a structure for a double-slotted leading edge pivoted flap of superior aerodynamic characteristics.

Yet one more object of the invention is to provide a retractable pivoted flap which when extended increases the effective curvature of the wing leading edge proper.

These and other objects and features of the invention will be more readily apparent from a perusal of the description of the embodiments of the strutures illustrated in the accompanying drawings, in which:

FIGURE 1 shows a cross-sectional view of my pivoted slotted leading edge flap installed in the forward lower portion of a wing.

FIGURE 1A is an auxiliary figure to FIGURE 1.

FIGURE 2 shows a cross-sectional view of my device installed on a thinner wing; the figure also illustrates modification of the new flap with a small Kruger type of auxiliary flap.

FIGURE 3 shows in similar cross-sectional view my design incorporated in a very thin wing and in combination with a droop nose.

FIGURE 4 shows a cross-section view of my pivoted leading edge flap mounted externally as a high lift modification for an existing wing.

FIGURE 5 shows a cross-sectional view of my pivoted leading edge flap installed as a high speed modification for an existing wing whereby the camber and leading edge size of the existing wing are reduced. Yet high lift is improved with the device.

FIGURE 6 is an auxiliary figure showing the flap of FIGURE 5, incorporating a collapsible flap leading edge tube.

FIGURE 7 shows a cross-sectional view of my flap illustrated retracted inside a wing in a double-slotted configuration and with an auxiliary flap door.

FIGURE 8 shows a structure similar to that of FIGURE 7 but somewhat simplified and incorporated on the leading edge of thin wing.

FIGURE 9 shows a scale, the percent of wing chord which can be used to evaluate the proportions of FIGURES 1, 2, 3, 4, 5, 7 and 8.

With initial reference to FIGURE 1, I show therein a cross-sectional view of the nose portion of medium thick airfoil section, say of the type of the NACA 63–212, incorporating my slotted leading edge flap. Specifically, the figure shows a forward wing portion 1, supporting a leading edge flap 4 by means of flap bracket. Bracket 3 connects flap 4 to pivoted spanwise axis 2 located at a selected position adjacent to the upper surface of the leading edge of wing portion 1. My flap 4 is shown in its high lift position, increasing the camber and chord of the wing. In addition, according to the invention, the flap hinge location chosen is such that in the high lift position 4, the flap's thin edge 12 defines a slot between the flap and the leading edge of wing portion 1. The flap hinge location will be explained later. The slot should be preferably contracting in the direction of the flow as shown and of a width approximately between 5 and 1 percent of the wing chord. Through the slot flows a high speed sheet of air, and from the high pressure region below the wing to the low pressure region above the wing. This high speed sheet of air serves to reenergize the flow and boundary layer above the wing, to significantly increase the lift coefficient of the wing, and its angle of attack range beyond those possible for leading edge flap without a slot. These aerodynamic improvements are of great importance for conventional aircraft, for V/STOL airplanes, and for tilt wing aircraft which have to operate with extremely large effective wing angles of attack.

Observe, however, that these excellent aerodynamic features in my slotted leading edge flap have been obtained not through cumbersome structural complexities or translating parts (such as slats on tracks, etc.), but by virtue of the new, ingenious, simple and superior location of the flap's pivot axis and the flap's surface with respect to each other and with respect to the wing. This geometric relation can be better described with the aid of the drawings showing the flap in the high speed retracted position: it is seen that the lower surface of the wing portion 1 has a recession 5 which serves to accommodate the retracted leading edge flap 4 in position 6 wherein the surfce of the flap on the side opposite to the flap pivot axis 2 forms actually part of the airfoil's surface in the high speed condition. This surface should be preferably curved as shown. The flap has a thin edge adjacent to the pivot as in 2, approximately below the pivot axis, and on the lower surface of the wing slightly to the rear of the leading edge of the wing proper. This position is indicated by arrow 7. Now, carefully observe that instead of hinging the flap structurally usual and obvious point, like say point 7 (which would result in a Kruger flap), the hinge axis is displaced upward above edge 7 by means of previous described sample fixed flap bracket 3, to hinge position 2.

Axis 2 should be placed adjacent to the upper surface of the flap and away from edge 7 at a distance which for this type of geometry is approximately equal to the gap distance between the flap edge and the wing leading edge when the latter is in the high lift position. Thus, in the figure, the distance between axis 2 and edge 7 is about 2½% of the wing chord. Additionally, however, the flap hinge axis is placed with respect to the wing and flap as shown in the drawing such that when the flap is rotated about axis 2 by about 130° to high lift position 4, a slot between the flap and the wing's leading edge is formed. The slot shown has a gap of about 2½% of the wing chord. It is the presence of the slot with its fluid reenergizing features that enables aerodynamic improvement beyond those possible with an unslotted flap of similar mechanical structures.

It is evident by inspection of the drawing that relatively large angular motion of flap 4 is possible without significant changes of the slot's gap. Observe also that there is a peculiar downward curvature on the flap's thin edge 12 near the slot's end. The curvature, which is favorable for lift as is known from flap theory, would not be present in conventional slot designs. This peculiar curvature is possible because this edge in the retracted position forms part of the wings curved lower surface immediately adjacent to the leading edge of the wing. In fact, that curvature can be pre-set at a larger value than the one shown in the extended position; when retracted, the fixed wing position will then straighten out the excess curvature by contact at point 7, and also serve as a tight pressure fit.

Another feature of interest is that the wing's lower skin in recession 5 can be shaped such as to provide a highly undercambered, smooth leading edge entry for the wing portion of the slot lip which feature is very favorable for high lift. It should be observed that in the invention, the surface interruptions due to the retracted flap are in the wing's lower surface. Thus, the local flow disturbances due to the interruptions are damped by the favorable pressure gradient of the flow which is going from pressures higher than atmospheric to atmospheric at the wing's trailing edge; and a smooth upper surface is possible for laminar flow. In contrast, flow disturbances in and/or due to surface interruptions in the upper surface of the wing which exist with conventional slots, tend to amplify due to the adverse pressure gradients.

As an alternate feature for determining the slot gap, thin edge 12 of the flap can be reduced in length, say to position 14, whereby the slot gap can be increased in size or the position of flap pivot axis can be lowered closer to the air-foil's chord line. The latter arrangement is of advantage as it permits the use of my device in very thin wings. This feature will be illustrated in later figures.

Evidently, my slotted leading edge flap may be actuated in any number of ways known in the art and used for plain pivoted flaps such as split trailing edge flaps or Kruger leading edge flaps, or by the mechanism I show in my FIGURE 4.

Summarizing the features of the embodiment of FIGURE 1, it is seen that by the ingenious and superior choice of leading edge flaps axis and related geometry, there is obtained a structurally simple pivoted leading edge flap which yet by virtue of its peculiar geometry, can form when extended, a high lift slot with the leading edge of the wing to increase the wing angle of attack range and lift beyond the value possible without the slot. Additionally, the shape of the flap's thin edge is favorably curved near the slot, and the wing's under surface can be shaped to have high local undercamber, both of which features are beneficial for high lift.

Furthermore, tight simple fittings can be made between the flap and the wing, due to absence of translation of the flap, and the surface interruptions are located in the wing's lower surfaces where the drag disturbances are damped out quickly. With my device, the wing's upper surface can then be smooth and uninterrupted. Evidentally, conventional structural design and flap actuator mechanisms can be used to construct and operate my new slotted leading edge flap.

As an alternate structure to FIGURE 1, I want to show an optional feature in the flap proper in FIG. 1A: In the thick rounded flap edge, away from the thin flap edge and the flap pivotal axis, there is shown an optional pivoted flap additional 9, pivoted at spanwise axis 10 on the flap, and which can be deflected by arc 11. It has a flap-extended spring-fixed high lift position 15, shown schematically by line 15, wherein it increases the camber of the flap itself and fixes the flap stagnation streamline on the flap's upper surface on the thin edge of flap portion 9. When the flap is retracted next to the wind in its recession (not shown but a mating recession to the flap similar to recession 5 in FIG. 1) the flap wing contact straightens out the flap's pivoted addition to the location 9 shown, wherein a smooth tight fit is obtained.

Also, when the flap is extended, the under surface of the wing which mates the flap would be evidently of gentle curvatures and favorable for low drag at high lift.

Yet one more important feature of the invention which is obvious by inspection of FIGURE 1, is that the device can be easily installed as a modification to existing wings in airplanes with a slight modification in the under surface.

I will now describe additional embodiments of my slotted leading edge flap on thinner wings suitable for near sonic and supersonic flight. In these additional embodiments, there are also shown in the wing portions the use of well known leading edge devices but of relatively small size which act in combination with my larger, new, slotted leading edge.

In FIGURE 2, I show a partial cross-sectional view of my slotted leading edge flap incorporated in a thinner airfoil section suitable for high speed, say of the type of the NACA 65–210. Specifically, the figure shows a forward wing portion 20 having a slotted leading edge flap 23 shown in a high lift position supported by means of brackets 22 to flap pivotal axis 21. Axis 21 is located adjacent to the wing's upper surface and adjacent to the wing's leading edge proper. The geometric relations between flap, pivot axis and wing are again described in the flap-retracted position: the wing's lower surface has a recession 24 which accommodates flap 23 into retracted position 25, wherein the flap's surface opposite to this pivot axis forms part of the airfoil's contour. The thin edge 33 of the flap adjacent to the pivot axis 21 is seen located to the rear of axis 21 by about 4% of the wing chord and on the wing's lower surface. When the flap is pivoted about axis 21 in a clockwise direction from position 25 to high lift position 23 or 26 along arc 34, then edge 33 determines the high lift slot between the flap and the wing.

So far, I have described my leading edge flap on the wing. Now I point out how the combination of my slotted leading edge flap with a small-size conventional leading edge flap, say of the Kruger type; the Kruger type leading edge flap is a simple spanwise pivoted door, as mentioned earlier in paragraph 3 of this specification. The combination forms a unique structure which improves the shape of the high lift slot. It is seen in FIGURE 2, that an auxiliary conventional Kruger type flap is mounted at leading edge axis 29 and extends to the high lift position 30. The combination of surfaces of the auxiliary flap, together with my slotted flap, determine a favorable contracting channel 28 of relatively long length and having a direction nearly perpendicular to the wing's chord. The contraction ratio of the slot can be set for any position of my slotted flap 23 by varying angle 31 of the auxiliary flap. The auxiliary flap can be retracted to position 32 for high speed flight.

The combination of my slotted flap and the conventional door leading edge flap may be of particular advantage for wing flows at very large effective wing angles of attack, such as in jet winged aircraft, or near the engine pylons below a swept wing, or for STOL approaches of tilt wing airplanes.

It should be observed that as an alternate structure to auxiliary flap 30, an inflatable leading edge membrane or boot may be used in combination with slotted leading edge flap to extend the length of the slot. Since such boots are known in the art (see, for instance, U.S. Patent 2,934,288), they will be omitted here.

In FIGURE 3, I show an installation of my slotted leading edge flap in combination with a conventional droop nose. The combination is exemplified on a very thin airfoil, say of the type of the NACA 65006. Specifically, the figure shows a forward wing portion 40 supporting at axis 48 a conventional droop nose 41 which can move as shown by arc 49. Also, in the retracted position, inside the appropriate wing recession 44, there is shown my slotted high lift flap 45. Observe that position 45 is substantially to the rear of the leading edge of this wing, an therefore there is a fixed wing skin surface 40 between the droop nose and the retracted flap. Flap 45 is supported at axis 41 by a bracket. For intermediate lift coefficients, flap 45 is rotated clockwise about axis 41 to a position similar but beyond position 43, whereby a slot is formed on location 46 between the flap and the undeflected droop nose.

For higher lifts, the droop nose is lowered counter clockwise to position 47, and the flap is positioned in location 43, whereby a long contracting slot 50 is defined. Again, for any flap position, the slot contraction and gap may be defined with the aid of the droop nose.

As a structural refinement, for the case of swept wings, brackets 42 should preferably be installed such that their surfaces are aligned to the slot flow in the flap extended position. Since in that position the surfaces need not be perpendicular to axis 41, then the mechanical connection of the brackets at axis 41 may be made with self-aligning bearings.

As shown, the brackets in the flap extended position are located below the exhaust mouth of the slot and the local flow disturbances due to bracket non-alignment are minimized by the stabilizing contraction of the slot above the bracket.

In FIGURE 4, I describe another embodiment of my invention which is particularly suitable for modification of existing wings. Specifically, I show in cross-sectional view, the forward portion 60 of a wing having an upper surface, a leading edge, and a lower surface. External to the wing's surfaces, there is shown installed my high lift slotted leading edge flap. On the wing's upper surface, there is shown a fixed wing bracket 61 which is positioned as a wing fence. The wing bracket supports at pivotal connection 62, which can be seen in the figure to be adjacent and external to the leading edge of wing 60; a flap bracket 63 with flap 64 shown in the high lift position. It can be seen in the figure that brackets 61 and 63 are placed in a vertical plane and in a chordwise direction, as wing fences are usually placed. A converging slot 69 is defined between flap 64 and the leading edge of wing 60. For high speed flight, flap 64 is moved counter clockwise about axis 62, by retraction of push rod 71 and piston 70, to final flap position 66. The flap in position 66 forms an external streamlined bulge below the wing's lower surface and a fixed, external flap fairing 65 is provided to prevent flow deterioration. Flap bracket 63 is now in position 67.

It should be observed that this modification does not change the leading edge radius of the wing nor its thickness-chord ratio but only the thickness distribution and wing camber. The camber change is favorable and is not large. The entire modification to the wing is extremely simple as only external brackets and reinforcements are necessary. Significantly improved lift and angle of attack ranges are obtained with a negligible drag penalty.

In FIGURE 5, I show the installation of my device as a modification on a wing whereby a new airfoil section of reduced camber and leading edge radius is obtained. These reductions are useful for near sonic speed of flight as they increase the cruise mach number and the mach number of drag rise, and reduce adverse compressibility effects; therefore, the modifications are specially adaptable for existing high speed jet transports and the like. As can be seen, however, the high lift slow speed characteristics are also improved. Specifically, FIGURE 5 shows a conventional wing 80 having a large leading edge radius shown by means of circle 81 at the forward end of a relatively highly curved mean camber line of airfoil 80. This mean camber line is shown in the figure as a double dash double dot line. To the wing 80, there is added, as a modification, a leading edge glove 82 which supports at spanwise pivotal axis 83, a slotted high lift leading edge flap 86 by means of flap brackets 85. The flap is shown extended in high lift position forming a slot 89 for high energy air 84. The flap is retracted by angular motion to high speed position 87, wherein it forms the lower surface of the modification glove for high speed flight.

As an alternate modification, there is shown in FIGURE 6, an alternate cross-shape 90 of the flap 86, which, when retracted, would fall inside the wing 80 at position 88. This obviously would require a special recession on wing 80.

To avoid this special recession in an existing wing but retain a large radius on the leading edge, the latter is made collapsible.

I show a portion of flap 86 and bracket 85 supporting a collapsible inflatable spanwise boot 90 which can be inflated by gas tube 92 for high lift and collapsed for high speed by releasing the gas pressure and subsequent action of a spring or similar device which moves boot to position 91. The relative position of the retracted flap to the wing's unmodified under surface is illustrated by the latter's relative location shown as dash dot lines 80 which for this purpose appears in the figure inverted and inclined to the flap. Preferably, the cross sectional area of tube 90, and the curvature of the flap defined by tube 90 with plate 86, should be greater than the cross sectional area and curvature, respectively, of the basic airfoil, as is made possible by the above described features and is also shown, say, in FIGS. 8 and 7.

The inflatable membrane may be constructed by any known means for inflatable boots—for instance, according to U.S. Patent 2,934,288.

It should be observed from the structures of FIGURES 5 and 6, that the leading edge radius and camber of the modified wing has been decreased with the glove, but yet, my new high lift slotted leading edge device has been incorporated to improve the high lift characteristics above those of the original wing. Thus, the device acts to improve both the high speed and slow speed regimes of the aircraft.

In FIGURE 7, I show an embodiment of my structure optimized for aerodynamic excellence. My high lift leading edge flap—shown retracted with a high speed airfoil of the type of the NACA 65210—consists essentially of a double slotted leading edge flap arrangement, the cross-sectional shape of which is independent from the cross-shape of the airfoil's leading edge shape.

This freedom of choice of flap cross-shape, unlike the conventional slat (which has a cross-type conforming the airfoil's leading edge shape) permits to prescribe in my flap a greater curvature of camber, a larger flap leading edge radius and, in the embodiment shown, a fixed high-lift slot on the flap itself for yet additional lift.

Specifically, FIGURE 7 shows a wing 95 supporting near its leading edge at spanwise axis 96 a double slotted leading edge flap 98 by means of flap brackets 97. The double slotted flap has a main flap portion 98 and a forward vane 99. The vane is shown fixed but could be pivoted to its support if desired. The flap is housed within leading edge portion of wing 95 and in part forms a portion of the wing's lower surface, the latter is faired smooth to the flap by means of door 100, which also serves to house the flap. To move the flap to its high lift position, the door fairing 100 is moved counter clockwise along arc 102 about axis 101, to allow emergence of the flap. The flap is moved clockwise about axis 96 along arc 103 by about 135 degrees to a high lift position in which a slot is formed between the thin edge of portion 98 and the wing's leading edge (see, for instance, slot of FIGURE 1). Thus, the flap-wing slot, plus the fixed slot in the flap proper, form a double slotted leading edge flap arangement of excellent aerodynamic efficiency. When the flap is moved to the high lift position, fairing 100 may be closed clockwise and inwards, such that its forward edge falls adjacent to wing location 104.

It should be observed that the structure previously described can be simplified by making the flap of smaller size than shown without the forward vane, in which case, the size of the door which acts as a flap fairing could be reduced substantially. This is illustrated in FIGURE 8, showing a very thin wing 110 having my highly curved slotted flap 113 supported by bracket 112 to spanwise axis 111. The wing has a door 114 which allows emergence of the flap to high lift position 115 in which slot 116 is formed between the flap's thin edge 117 and the wing's leading edge. Observe that in this structure the flap's curvature or camber, and the flap's leading edge radius, are much larger than those of the basic wing or than those that could be incorporated in a standard leading edge slat.

In FIGURE 9, I show which may be used to exemplify, the relative sizes and gaps of the embodiments illustrated. The scale is presented in terms of percent of wing chord and is useful for FIGURES 1, 2, 3, 4, 5 and 7. This scale is included, however, by way of example and not by way of limitation.

There are other variations and modifications of the structures of my high lift slotted flap. For instance, the leading edge flap may be connected by a four-bar linkage instead of a simple pivotal connection or the flap may be located between a fuselage and a nacelle and hinged to them directly and not to the wing structure.

Also, my slotted flap mechanism can be used for elevators, stabilizers, hydrofoils and other fluid sustained vehicles. It should be mentioned that the various structure features of the embodiments are inter-related. For instance, the wing door of FIGURE 7 can be used in the wing of FIGURE 6.

Various further modifications and alterations from those described hereinabove can obviously be made without departing from the spirit of the invention, and the foregoing is to be considered as purely exemplary application thereof. The actual scope of the invention is to be indicated by the apended claims.

I claim:
1. A wing having a leading edge portion, an upper surface and a forward lower surface and a leading edge flap mounted on said wing by means of a bracket fixedly attached to said flap and pivoted to said wing at a single hinge axis adjacent and approximately parallel to said leading edge, with said flap being a streamlined body and having a thin spanwise edge and a rounder spanwise edge and means for moving said flap between a first inverted position in which said flap is faired adjacent to said lower surface and is disposed below said upper surface of said wing with its thin edge adjacent to said leading edge portion and its rounded edge trailing said thin edge and said leading edge portion, and a second upright position in which said flap is substantially in front of and downwardly inclined with respect to said leading edge portion of said wing and in which the undersurface of said flap in said second position adjacent to said thin edge of said flap is spaced from the leading edge portion of said wing to define converging slot walls therebetween for fluid flows upwardly through said slot; said leading edge flap being further characterized by having a camber greater than that of the said leading edge portion of said wing, with said leading edge flap in said first position having its said thin spanwise edge contiguous to a portion of said forward lower surface and its said rounded edge contiguous to a portion of said upper surface of said wing leading edge portion.

2. The structure of claim 1 further characterized in that the camber of the upper surface of the said leading edge flap in said second position is greater than the camber of the upper surface portion of said wing which is located above said leading flap when said leading edge flap is in said first position.

3. The structure of claim 1 further characterized in that cross-sectional area of the leading edge region of said leading edge portion of said wing which extends in a first distance between the leading edge of said wing and a wing location substantially at the location of said thin edge in said first position, is substantially smaller in area, and substantially sharper in shape, than the cross-sectional area and shape of the leading edge region of the rounded edge of said leading edge flap which extends between the leading edge of said flap in said second position and a downstream location on said leading edge flap at a distance from said leading edge of said leading edge flap equal to said first distance.

4. A wing having a leading edge portion, an upper surface and a forward lower surface and a leading edge flap mounted on said wing by means of a bracket fixedly attached to said flap and pivoted to said wing at a single hinge axis adjacent and approximately parallel to said leading edge, with said flap being a streamlined body and having a thin spanwise edge and a rounded spanwise edge and means for moving said flap between a first inverted position in which said flap is faired adjacent to said lower surface and is disposed below said upper surface of said wing with its thin edge adjacent to said leading edge portion and its rounded edge trailing said thin edge and said leading edge portion, and a second upright position in which said flap is substantially in front of and downwardly inclined with respect to said leading edge portion of said wing and in which the undersurface of said flap in said second position adjacent to said thin edge of said flap is spaced from the leading edge portion of said wing to define converging slot walls therebetween for fluid flows upwardly through said slot; said leading edge flap being further characterized in having internal walls which define a second slot located on said leading edge flap between said thin and rounded edges, and in that when said leading edge flap is in said second position the said second slot, together with said converging slot, define a double-slotted leading edge flap.

5. The structure of claim 4 further characterized in that a spanwise movable panel is mounted on said forward lower surface, which when said leading edge flap is in said first position, fairs said leading edge flap to the lower surface of said wing and covers said second slot.

References Cited
UNITED STATES PATENTS

| | | | |
|---|---|---|---|
| 1,880,019 | 9/1932 | Harper | 244—42 |
| 2,941,751 | 6/1960 | Gagarin | 244—42 |
| 2,990,140 | 6/1961 | Mazelsky | 244—42 |
| 3,089,666 | 5/1963 | Quenzler | 244—42 X |

FOREIGN PATENTS

| | | |
|---|---|---|
| 459,730 | 1/1937 | Great Britain. |
| 1,011,175 | 4/1952 | France. |

MILTON BUCHLER, *Primary Examiner.*

EMILE PAUL, *Examiner.*

B. BELKIN, *Assistant Examiner.*